United States Patent
Robertson, Jr. et al.

(10) Patent No.: US 9,200,531 B2
(45) Date of Patent: Dec. 1, 2015

(54) FAN CASE RUB SYSTEM, COMPONENTS, AND THEIR MANUFACTURE

(75) Inventors: Thomas J. Robertson, Jr., Glastonbury, CT (US); Mark W. Costa, Storrs, CT (US); Johan R. Santana, Westerly, RI (US)

(73) Assignee: United Technologies Corporation, Hartford, CT (US)

(*) Notice: Subject to any disclaimer, the term of this patent is extended or adjusted under 35 U.S.C. 154(b) by 792 days.

(21) Appl. No.: 13/362,654

(22) Filed: Jan. 31, 2012

(65) Prior Publication Data

US 2013/0195605 A1 Aug. 1, 2013

(51) Int. Cl.
| | | |
|---|---|---|
| *F01D 11/18* | (2006.01) | |
| *F01D 11/12* | (2006.01) | |
| *F01D 25/26* | (2006.01) | |

(52) U.S. Cl.
CPC .............. *F01D 11/18* (2013.01); *F01D 11/125* (2013.01); *F01D 25/26* (2013.01); *F05D 2220/36* (2013.01); *F05D 2230/68* (2013.01); *F05D 2300/173* (2013.01); *F05D 2300/433* (2013.01); *F05D 2300/44* (2013.01); *F05D 2300/50212* (2013.01); *F05D 2300/603* (2013.01); *Y02T 50/672* (2013.01); *Y10T 29/49323* (2015.01); *Y10T 156/10* (2015.01); *Y10T 156/17* (2015.01)

(58) Field of Classification Search
USPC ....................................... 415/9, 200
See application file for complete search history.

(56) References Cited

U.S. PATENT DOCUMENTS

| | | |
|---|---|---|
| 2,994,472 A | 8/1961 | Botje |
| 3,104,091 A | 9/1963 | Vivian |
| 4,251,185 A | 2/1981 | Karstensen |
| 4,307,993 A | 12/1981 | Hartel |
| 4,662,658 A | 5/1987 | Holowach et al. |
| 4,785,623 A | 11/1988 | Reynolds |
| 4,786,232 A | 11/1988 | Davis et al. |
| 5,080,557 A | 1/1992 | Berger |
| 5,160,248 A | 11/1992 | Clarke |
| 5,201,887 A | 4/1993 | Bruchez, Jr. et al. |
| 5,233,822 A | 8/1993 | Ward et al. |
| 5,291,732 A | 3/1994 | Halila |
| 5,318,402 A | 6/1994 | Bailey et al. |
| 5,320,486 A | 6/1994 | Walker et al. |
| 6,227,794 B1 | 5/2001 | Wojtyczka et al. |
| 6,364,603 B1 | 4/2002 | Czachor et al. |

(Continued)

FOREIGN PATENT DOCUMENTS

| | | |
|---|---|---|
| JP | 2001-241397 A | 9/2001 |
| JP | 2009-515075 A | 4/2009 |
| JP | 2010-031871 A | 2/2010 |

OTHER PUBLICATIONS

The GE90 Engine, geaviation.com.*

(Continued)

*Primary Examiner* — Nathaniel Wiehe
*Assistant Examiner* — Brian O Peters
(74) *Attorney, Agent, or Firm* — Bachman & LaPointe, P.C.

(57) ABSTRACT

A turbofan engine has a fan having a circumferential array of fan blades. A fan case encircles the fan. There is at least one compressor section, a combustor, and at least one turbine section. The fan case comprises a composite structural member and a metallic member encircled by the composite structural member. The metallic member is mounted to the composite structural member to permit differential thermal expansion proximate the blades.

27 Claims, 11 Drawing Sheets

(56) References Cited

U.S. PATENT DOCUMENTS

| | | |
|---|---|---|
| 6,382,905 B1 | 5/2002 | Czachor et al. |
| 6,637,186 B1 | 10/2003 | Van Duyn |
| 6,910,853 B2 | 6/2005 | Corman et al. |
| 6,935,836 B2 | 8/2005 | Ress, Jr. et al. |
| 7,241,108 B2 | 7/2007 | Lewis |
| 7,390,161 B2 | 6/2008 | Xie et al. |
| 7,402,022 B2 * | 7/2008 | Harper et al. ............ 415/9 |
| 7,694,505 B2 | 4/2010 | Schilling |
| 7,797,809 B2 | 9/2010 | Costa et al. |
| 7,866,939 B2 | 1/2011 | Harper et al. |
| 7,914,251 B2 | 3/2011 | Pool et al. |
| 8,016,543 B2 | 9/2011 | Braley et al. |
| 2008/0115339 A1 | 5/2008 | Blanton et al. |
| 2009/0056343 A1 | 3/2009 | Suciu et al. |
| 2009/0155065 A1 | 6/2009 | Xie et al. |
| 2010/0111675 A1 | 5/2010 | Wojtyczka et al. |
| 2011/0037233 A1 | 2/2011 | Harper |
| 2011/0044806 A1 | 2/2011 | Harper |
| 2011/0044807 A1 | 2/2011 | Bottome |
| 2011/0052383 A1 | 3/2011 | Lussier |
| 2011/0123326 A1 | 5/2011 | DiBenedetto et al. |

OTHER PUBLICATIONS

GE90-94B Engine Logs More than 10 Million Flight Hours, deagel.com, article from Apr. 1, 2008.*

Gunston, Bill, Editor, "Pratt & Whitney PW8000" Jane's Aero-Engines, Mar. 2000, pp. 510-512, Issue Seven, Janes Information Group Limited, Coulsdon, United Kingdom.

Japanese Office Action for JP Patent Application No. 2013-012762, dated Jan. 7, 2014.

Japanese Office Action for JP Patent Application No. 2013-042483, dated Feb. 18, 2014.

Office action for U.S. Appl. No. 13/361,990, dated Mar. 20, 2015.

* cited by examiner

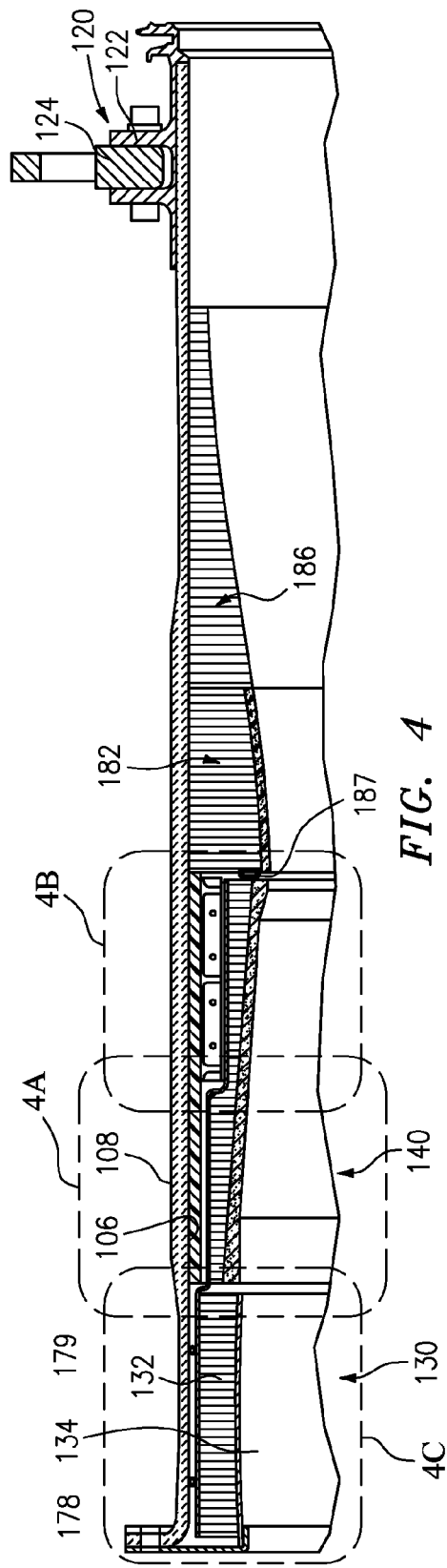
FIG. 4
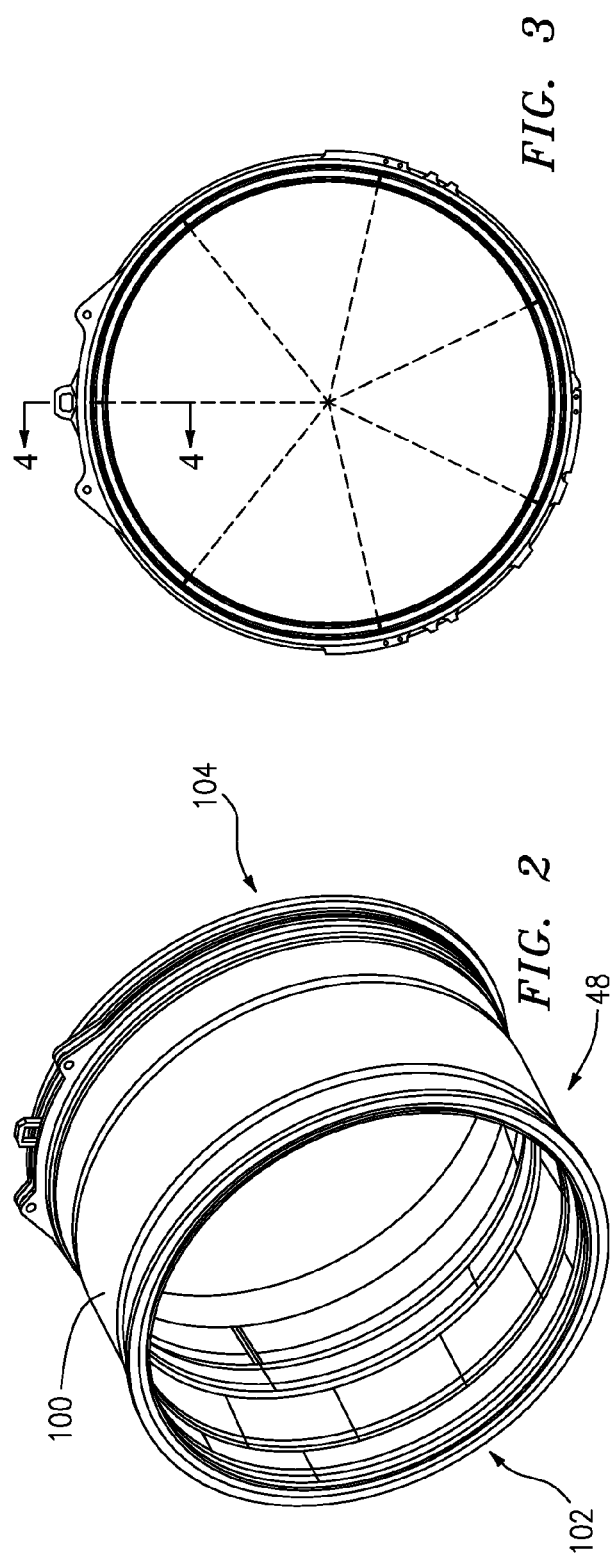
FIG. 3
FIG. 2

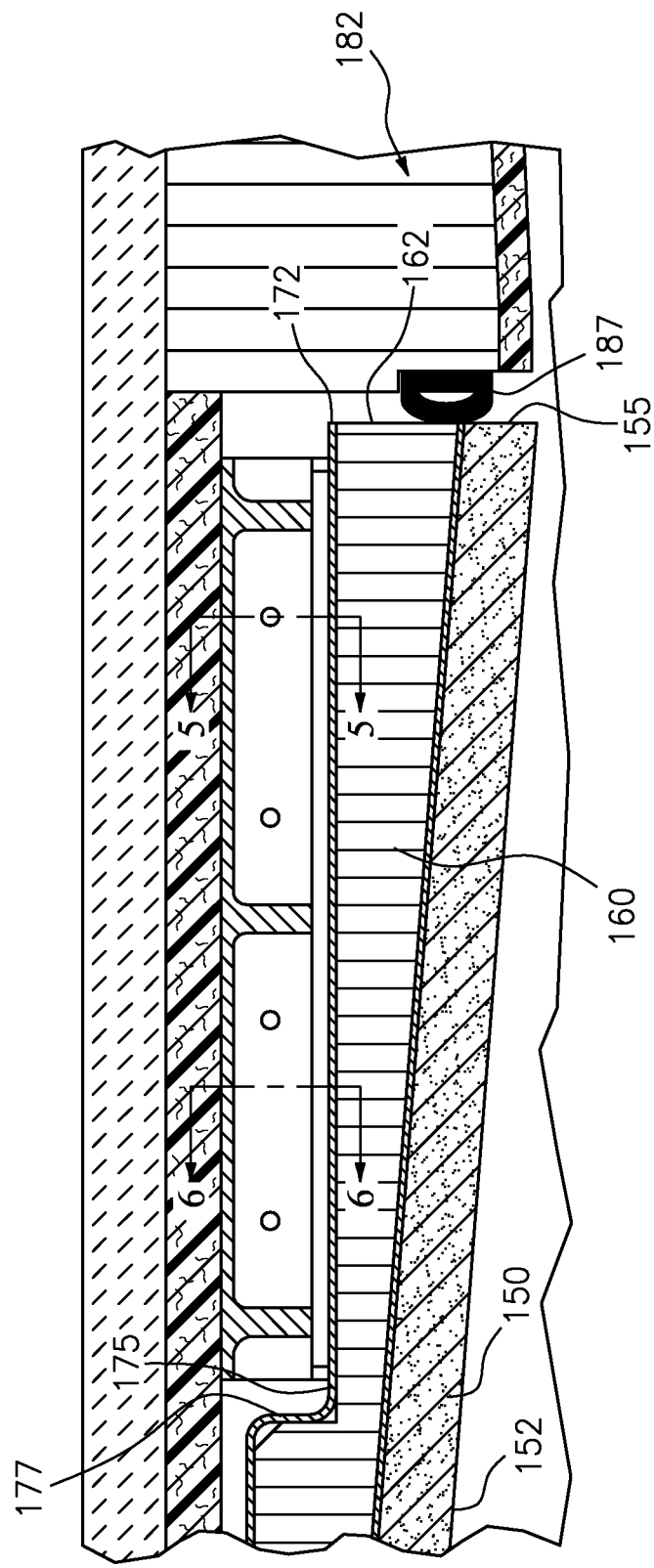

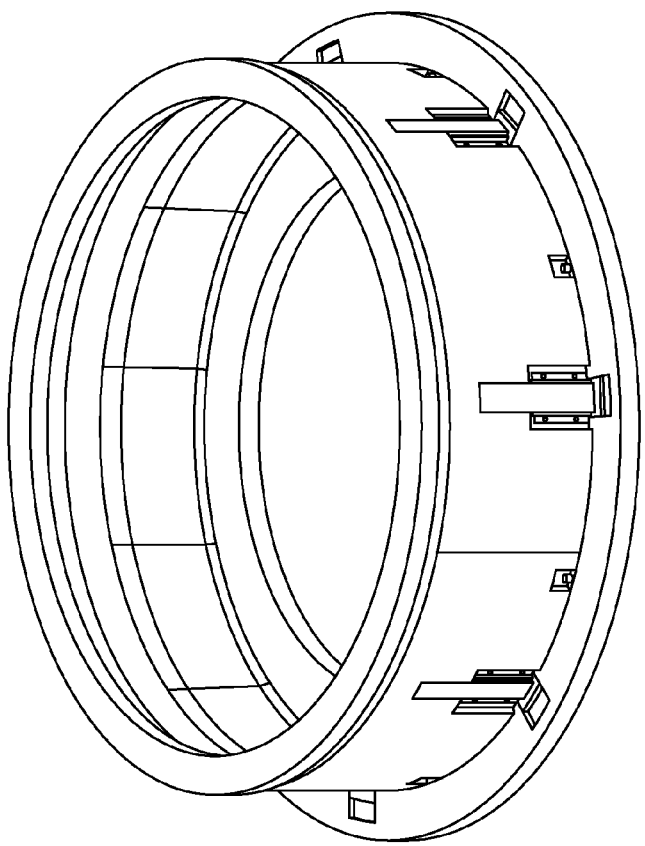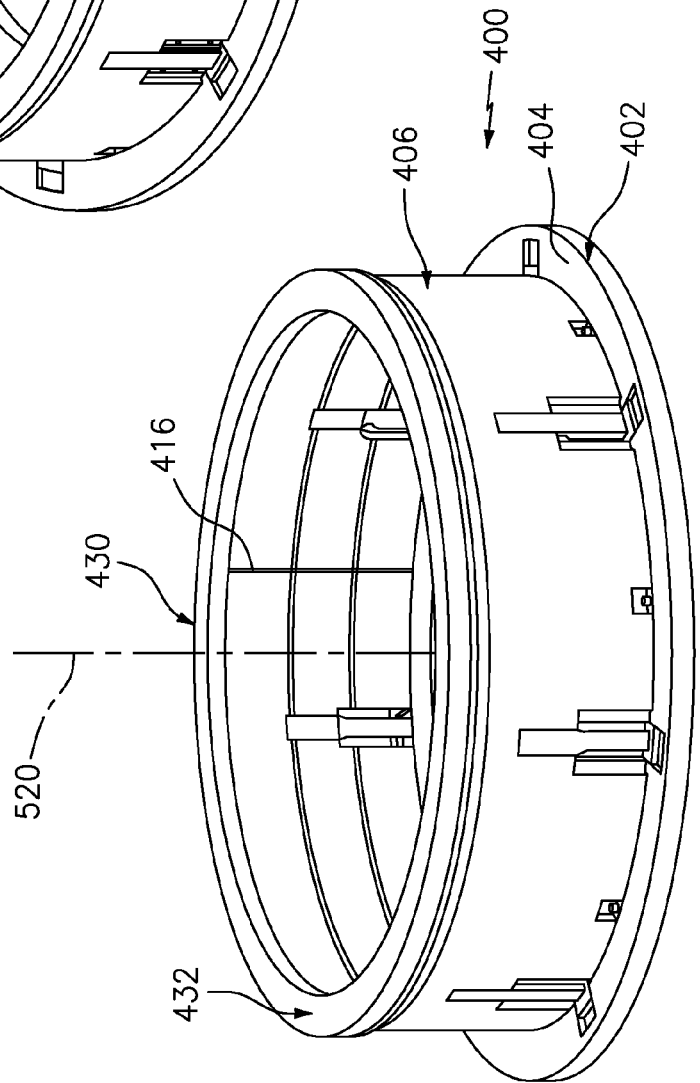

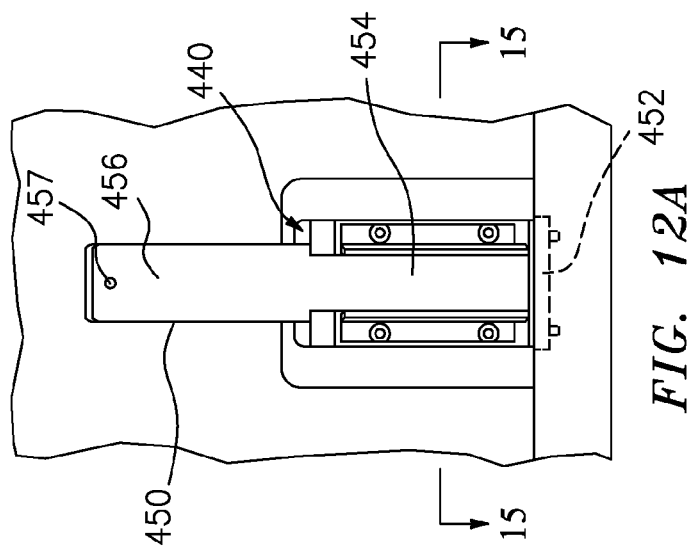
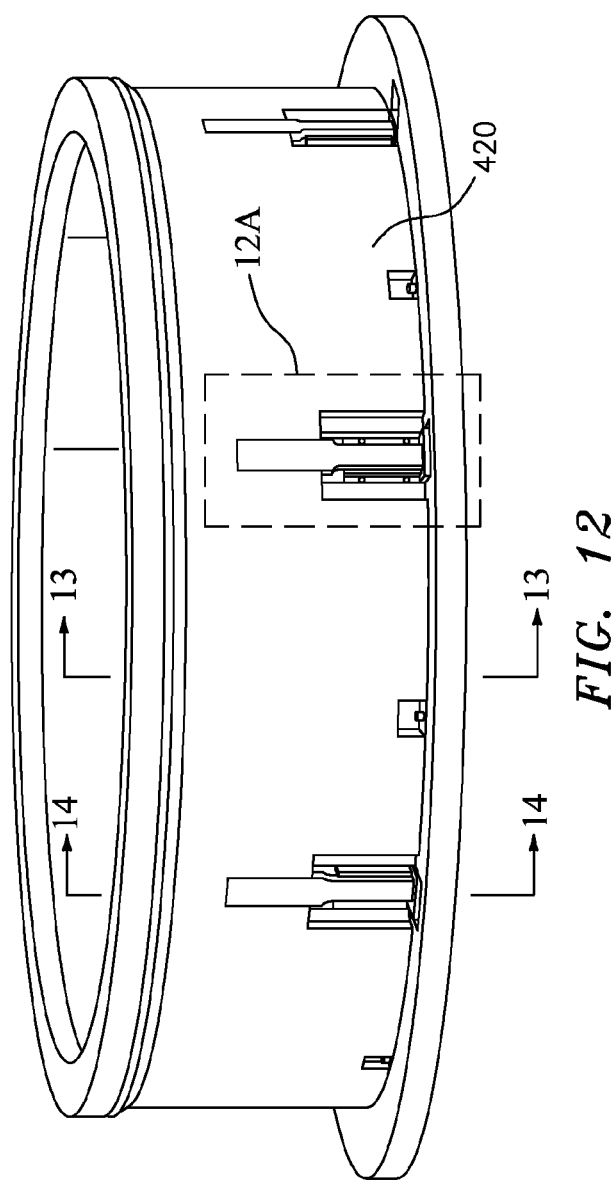
FIG. 12A
FIG. 12

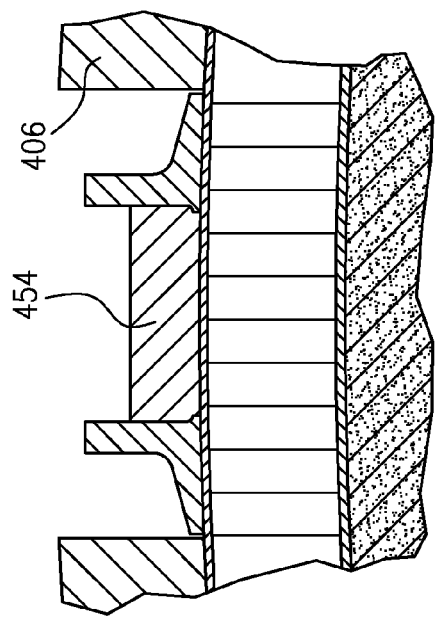
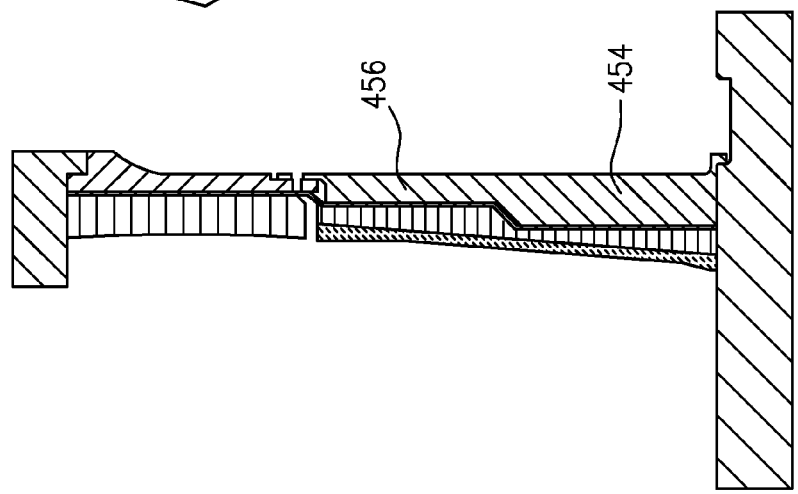
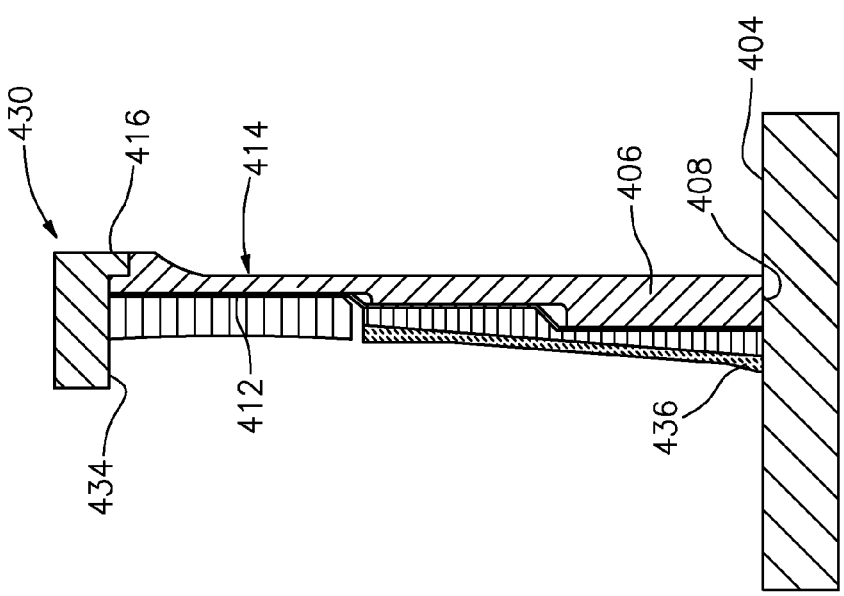

US 9,200,531 B2

FAN CASE RUB SYSTEM, COMPONENTS, AND THEIR MANUFACTURE

BACKGROUND

The disclosure relates to gas turbine engines. More particularly, the disclosure relates to fan tip clearance accommodation.

In turbofan engines, differences in the fan material versus fan case material may contribute to thermally-induced rub. Turbine engine fans and their cases experience differential thermal expansion across an operational range. For example, on the ground they are subject to a normal range in atmospheric temperatures (e.g., from 20 C to 40 C with an exemplary ambient temperature being 21 C). In flight, however, temperatures will typically decrease. Whereas other portions of the engine are subject to heating, the fan, and moreso, fan case temperatures may decrease at altitude (e.g., to an exemplary −60 C to −45 C). An exemplary temperature decrease from ground to altitude may be in excess of 50 C, more narrowly, 60-80 C or an exemplary 70 C.

With an exemplary metallic fan and non-metallic fan case (or structural portion thereof) the decrease in temperature will cause the fan to decrease in diameter more than the fan case (due to the fan having a higher coefficient of thermal expansion (CTE) than a structural portion of the fan case). When the inboard surface of the fan case moves radially with the structural case, a gap between fan blade tips and the fan case will increase, thereby potentially compromising performance.

SUMMARY

One aspect of the disclosure involves a turbofan engine comprising a fan having a circumferential array of fan blades. A fan case surrounds (encircles) the fan. There is at least one compressor section, a combustor, and at least one turbine section. The fan case comprises a composite structural member and a metallic member encircled by the composite structural member. The metallic member is mounted to the composite structural member to permit differential thermal expansion proximate the blades.

In additional or alternative embodiments of any of the foregoing embodiments, the composite structural member may comprise an organic matrix composite. In additional or alternative embodiments of any of the foregoing embodiments, abradable liner may be carried by the metallic member. In additional or alternative embodiments of any of the foregoing embodiments, the abradable liner may be non-metallic and a metallic honeycomb may be radially between the abradable liner and the metallic member. In additional or alternative embodiments of any of the foregoing embodiments, there may be a plurality of radially outwardly open channels on the metallic member. In additional or alternative embodiments of any of the foregoing embodiments, a plurality of radially inwardly radially projecting members may be received by the channels. In additional or alternative embodiments of the foregoing embodiments, at least one of: each of the radially outwardly open channels is formed by a pair of L sectioned metallic brackets with feet oppositely circumferentially outwardly projecting and legs radially outwardly projecting; each of the inwardly radially projecting members comprises a radially inwardly projecting portion and at least one pair of wear pads mounted circumferentially opposite each other to the radially inwardly projecting portion and in contacting or facing relation to respective sides of the associated channel; there are 4 10 said channels; a portion of the composite structural member aft of the metallic member is secured to a mounting ring; and a portion of the composite structural member aft of the metallic member encircles and is mounted to a guide vane ring.

In additional or alternative embodiments of any of the foregoing embodiments, the metallic member may be in a cartridge comprising: a first honeycomb having an ID liner encircled by a forward portion of the metallic member; a second honeycomb encircled by the metallic member aft of the first honeycomb; and a rub strip encircled by the second honeycomb.

In additional or alternative embodiments of any of the foregoing embodiments, the first honeycomb comprises a metallic honeycomb; the second honeycomb comprises an aluminum alloy honeycomb with ID aluminum alloy septum; and the rub strip comprises an epoxy-filled aramid fiber honeycomb and has ID and OD surfaces each radial converging aftward.

In additional or alternative embodiments of any of the foregoing embodiments, differential thermal expansion of the metallic member is constrained at a leading extremity relative to a trailing extremity.

Other aspects of the disclosure involve a method for operating the engine. The engine is accelerated from an initial condition of zero (rotational) speed, a fan case initial temperature, and an initial altitude. The engine is flown to a cruise condition of non-zero cruise speed, a fan case cruise temperature less than the fan case initial temperature, and a cruise altitude greater than the initial altitude. As the engine goes from the initial condition to the cruise condition, differential thermal expansion radially contracts the metallic member relative to the composite structural member (e.g., expanding local radial gaps).

In additional or alternative embodiments of any of the foregoing embodiments, accelerating the engine from an initial condition of zero speed, a fan case initial temperature, and an initial altitude; and flying the engine to a cruise condition of a non zero cruise speed, a fan case cruise temperature less than the fan case initial temperature, and a cruise altitude greater than the initial altitude, wherein: as the engine goes from the initial condition to the cruise condition, the differential thermal expansion radially contracts the metallic member relative to the composite structural member.

In additional or alternative embodiments of any of the foregoing embodiments, the relative radial contraction is mechanically resisted proximate a leading extreme of the metallic member.

In additional or alternative embodiments of any of the foregoing embodiments, the relative radial contraction is one or both of at least 0.3 mm or at least 0.05% of a fan tip radius at the initial condition.

Another aspect of the disclosure involves a turbofan engine case comprising a composite structural member and a metallic member encircled by the composite structural member and mounted to the composite structural member to permit at least a local differential thermal expansion.

In additional or alternative embodiments of any of the foregoing embodiments, the composite structure member may comprise an organic matrix composite.

One aspect of the disclosure involves a turbofan engine fan case cartridge comprising a metallic member. A first honeycomb has an inner diameter (ID) liner and is encircled by a forward portion of the metallic member. A second honeycomb is encircled by the metallic member aft of the first honeycomb. A rub strip is encircled by the second honeycomb.

In additional or alternative embodiments of any of the foregoing embodiments, the metallic member may be radially stepped. In additional or alternative embodiments of any of the foregoing embodiments, an outboard surface of the second honeycomb may be radially stepped corresponding to the radial stepping of the metallic member. In additional or alternative embodiments of any of the foregoing embodiments, the metallic member may bear, along an outer diameter (OD) surface, mounting means for engaging a fan containment case. In additional or alternative embodiments of any of the foregoing embodiments, the mounting means may form channels for receiving complementary members of the fan containment case. In additional or alternative embodiments of any of the foregoing embodiments, the mounting means may comprise pairs of L-sectioned brackets defining such channels between legs of the brackets.

One aspect of the disclosure involves a method for manufacturing a turbofan engine fan case cartridge. The method comprises assembling to a fixture the combination of a metallic outer member and a liner. A plurality of brackets are inserted through apertures in a sidewall of the fixture. The brackets are secured to the metallic outer member.

In additional or alternative embodiments of any of the foregoing embodiments, the liner may be bonded to the outer member. In additional or alternative embodiments of any of the foregoing embodiments, the bonding may comprise vacuum bag autoclave bonding. In additional or alternative embodiments of any of the foregoing embodiments, the fixture may comprise a mold tool having an axial split (e.g., a single axial split). In additional or alternative embodiments of any of the foregoing embodiments, the mold tool may be removed from a base after the securing. In additional or alternative embodiments of any of the foregoing embodiments, the split may be opened to allow removal of the assembled cartridge. In additional or alternative embodiments of any of the foregoing embodiments, the assembly of the liner to the metallic outer members may be performed in situ in the mold tool.

Another aspect of the disclosure involves a fixture for manufacturing a turbofan case cartridge. The fixture comprises a base and a mold tool having a mounted condition extending upward from the base and defining a central longitudinal axis. The mold tool comprises a sidewall with a plurality of openings. A capture plate extends radially inward at an upper portion of the mold tool so as to define an annular axial compartment for holding the cartridge between the base and the capture plate.

In additional or alternative embodiments of any of the foregoing embodiments, the mold tool may have a split (e.g., a single split allowing a circumferential expansion to open). In additional or alternative embodiments of any of the foregoing embodiments, a plurality of members may divide each of the openings into first and second circumferential portions. In additional or alternative embodiments of any of the foregoing embodiments, an inboard surface of the mold tool may be stepped. In additional or alternative embodiments of any of the foregoing embodiments, the base may be annular.

One aspect of the disclosure involves a turbofan engine comprising a fan having a circumferential array of fan blades. A fan case surrounds (encircles) the fan. There is at least one compressor section, a combustor, and at least one turbine section. The fan case comprises a composite structural member and a metallic member. A liner assembly is mounted to the composite structural member and has a forward portion and an aft portion. The forward portion has a forward end being relatively radially constrained compared to an aft end of the forward portion.

In additional or alternative embodiments of any of the foregoing embodiments, the forward end may be relatively radially constrained compared to an aft end of the aft portion. In additional or alternative embodiments of any of the foregoing embodiments, when operated from an initial condition to a cruise condition, differential thermal expansion may radially contract the aft portion relative to the composite structural member more than the forward portion contracts relative to the composite structural member. The initial condition may be zero speed, a fan case initial temperature and an initial altitude, whereas the cruise condition may have non-zero cruise speed, a fan case cruise temperature less than the fan case initial temperature, and a cruise altitude greater than the initial altitude.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 2 is a view of a fan containment case and liner assembly.

FIG. 3 is a transverse front end view of the assembly of FIG. 2.

FIG. 4 is a top axial sectional view of the assembly of FIG. 2.

FIG. 4B is an enlarged view of an aft portion of the forward liner cartridge region of the assembly of FIG. 4.

FIG. 10 is a view of a fixture for manufacturing the cartridge.

FIG. 11 is a view of the fixture of FIG. 10 with the cartridge in place.

FIG. 12 is a second view of the fixture of FIG. 11.

FIG. 12A is an enlarged view of a window region of the fixture of FIG. 12.

FIG. 13 is a partial axial sectional view of the fixture of FIG. 12 taken along line 13-13.

FIG. 14 is a partial longitudinal sectional view of the fixture of FIG. 12, taken along line 14-14.

FIG. 15 is a partial transverse sectional view of a window area of the fixture of FIG. 12, taken along line 15-15 in FIG. 12A.

Like reference numbers and designations in the various drawings indicate like elements.

DETAILED DESCRIPTION

Figure 1:
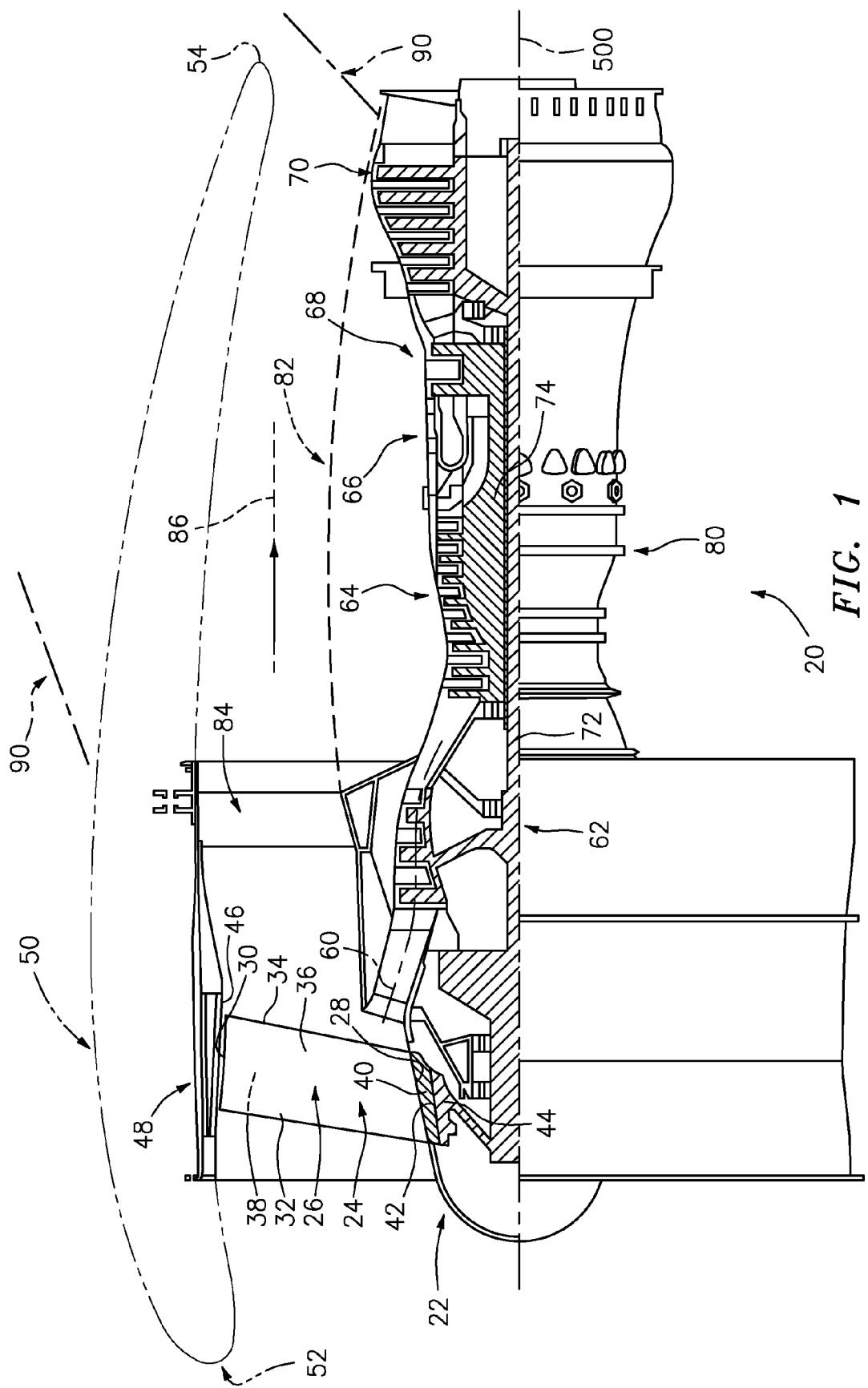
FIG. 1 is a partial axial partially sectional/cutaway view of a turbofan engine.

FIG. 1 shows a turbofan engine 20 having a centerline or central longitudinal axis 500. The engine includes a fan 22 at a forward/upstream end of the engine. The fan 22 has a circumferential array of fan blades 24. The exemplary blades 24 each have an airfoil 26 extending from a proximal end 28 to a distal end or tip 30. Each blade airfoil extends from a leading edge 32 to a trailing edge 34 and has pressure side 36 and a suction side 38. Inboard of the airfoil, each blade may include an attachment root 40 mounted in a complementary feature (e.g., a slot) 42 of a fan hub 44. The blade tips 30 are in close facing proximity to the inner/inboard surface 46 of a fan case 48. The exemplary fan case 48 is within an aerodynamic fan nacelle 50. The nacelle 50 extends from an upstream end/rim 52 to a downstream end/rim 54.

Downstream of the fan along a core flowpath 60 are, sequentially, one or more compressor sections 62, 64, a combustor section 66, and one or more turbine sections 68, 70. In the exemplary engine, there are two compressor sections and two turbine sections. The low pressure compressor section 62 is coupled to the low pressure turbine section 70 via a shaft 72. Similarly, the high pressure compressor section 64 is coupled to the high pressure turbine section 68 via a shaft 74. Driven by the respective turbine sections, the compressor sections sequentially compress a core flow of air received from the fan and deliver the compressed air to the combustor where the compressed air is mixed with fuel and combusted to generate high pressure combustion gases. These gases are sequentially expanded in the turbine sections to, in turn, drive the compressor sections. Each of the compressor sections and turbine sections may include one or more stages of blades interspersed with stages of vanes. The fan may be driven directly or indirectly by one of the turbine sections. For example, the fan may be coupled to the shaft 72 by a transmission so that the fan rotates about the centerline at a slower speed than does the shaft 72.

The core flowpath passes through an engine case 80. The engine case may be within an aerodynamic nacelle 82. Bearing systems may support the shafts and fan relative to the engine case for rotation about the centerline 500. A circumferential array of struts 84 may position the fan case relative to the engine case. The exemplary struts 84 are aft/downstream of the fan and extend across a bypass flowpath 86 outboard of the core flowpath.

To mount the engine to an aircraft, a pylon 90 may have a proximal end (not shown) mounted to the aircraft fuselage or wing. A distal end of the pylon may mount to the engine. The exemplary mounting involves connection to both the fan case and the engine case.

The fan blades are subject to radial expansion due to inertial forces associated with fan rotation (centrifugal loading). The fan blades are also subject to thermal expansion which is influenced by the material properties of the fan blades (e.g., the coefficient of thermal expansion (CTE)). The fan case is also subject to thermal expansion. In operation, there typically is a gap or clearance between the fan blade tips and the adjacent inboard surface portion of the fan case. On the one hand, it is desirable to keep this gap small to maintain engine efficiency. On the other hand, it is generally desirable to avoid having this gap fully close which produces rub.

Figure 4A:
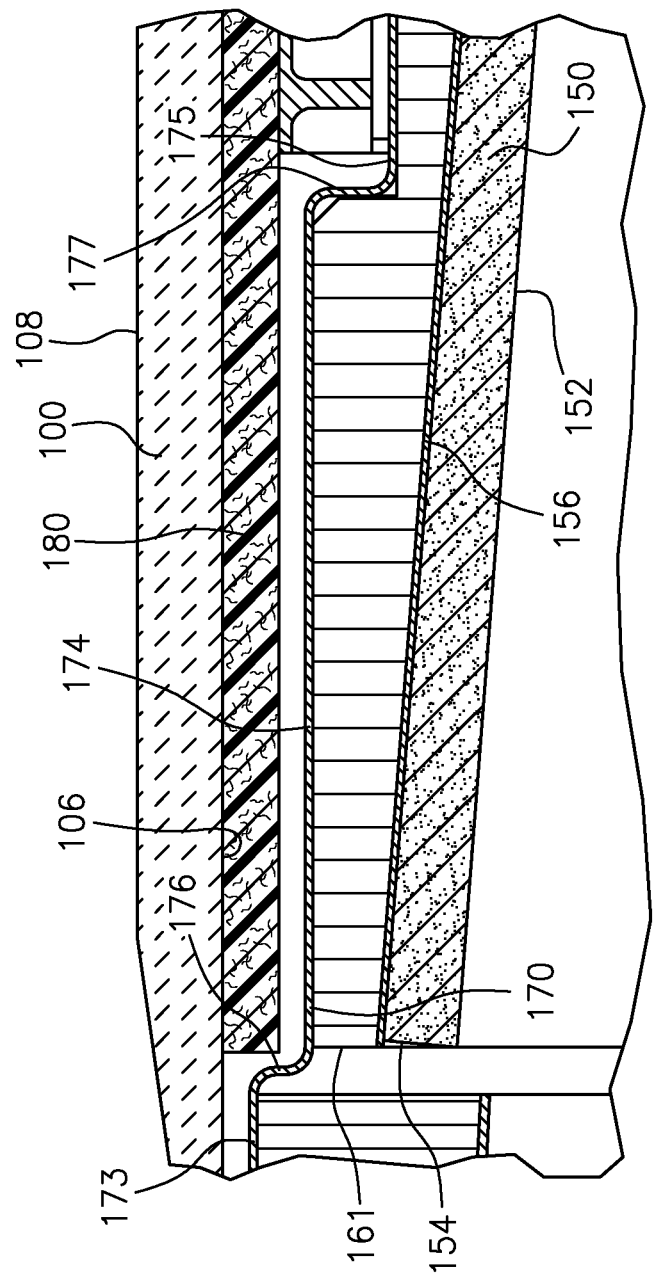
FIG. 4A is an enlarged view of a central portion of a forward liner cartridge region of the assembly of FIG. 4.

FIG. 2 shows further details of the fan case. The fan case includes a structural member/case comprising a containment case 100. The exemplary containment case is formed as a composite (e.g., carbon fiber and epoxy resin). The exemplary containment case is a full circumference/hoop structure. The exemplary containment case extends from an upstream rim/end 102 to a downstream rim/end 104. The containment case 100 has an inner/inboard surface 106 (FIG. 4) and an outer/outboard surface 108.

Proximate the upstream end 102, the containment case has a radially outwardly projecting flange 110 (the forward or "A-flange"). The fan case further includes a mounting ring structure 120 mounted to and encircling a downstream end portion of the containment case. The mounting ring structure may be formed of metal (e.g., titanium or aluminum) and may have a clevis or other mounting structure 122 for mounting to a forward engine amount of the pylon (e.g. via a mounting lug 124). From upstream-to-downstream, structures are mounted to the inboard surface 106 to define locally the outboard boundary of the air flowpath through the fan case. As is discussed further below, several of these structures are portions of a pre-assembled self-contained replaceable cartridge. Proximate the upstream end 102, is a forward acoustic liner 130. This may be formed of a honeycomb (e.g., a potted honeycomb 132 (e.g., aluminum alloy) having a aluminum liner 134).

Downstream/aft of the forward acoustic liner 130 is an abradable liner assembly 140. The liner assembly 140 (FIG. 4B) includes an abradable rub material (rub strip) 150 (e.g., filled epoxy with aramid honeycomb) having an inboard surface 152 in close facing proximity to the fan blade tips. The outboard (radially) surface of the abradable rub material 150 is mounted to the inboard surface of an aluminum (aluminum alloy) septum 156. The exemplary aluminum septum 156 is essentially full annulus (either continuous as a single piece or as rigidly attached segments). The aluminum septum 156 forms an inboard liner of a wedge honeycomb 160. In the exemplary embodiment, the septum 156 and honeycomb 160 are circumferentially segmented. In alternative embodiments, one or both may be continuous. Along an outboard boundary of the honeycomb 160, it may bear a circumferentially continuous aluminum alloy liner/layer 170 (metallic member). The exemplary liner 170 forms the unifying outer structure of the replaceable cartridge as is further described below. The honeycomb 160 is a wedge in that its radial span or thickness increases from upstream to downstream to provide local convergence of the surface 152.

The abradable rub material 150 extends from a leading edge/rim 154 to a trailing edge/rim 155. The honeycomb 160 extends from a leading edge/rim 161 to a trailing edge/rim 162. In the exemplary embodiment these are axially aligned with corresponding ends of the abradable rub material 150 and septum 156. The exemplary liner 170 extends from a forward/upstream end/rim and 171 to an aft/downstream end/rim 172. From upstream-to-downstream, the exemplary liner 170 has three progressively radially inwardly staggered sections 173, 174, and 175 separated by annular shoulders 176 and 177.

Figure 4C:
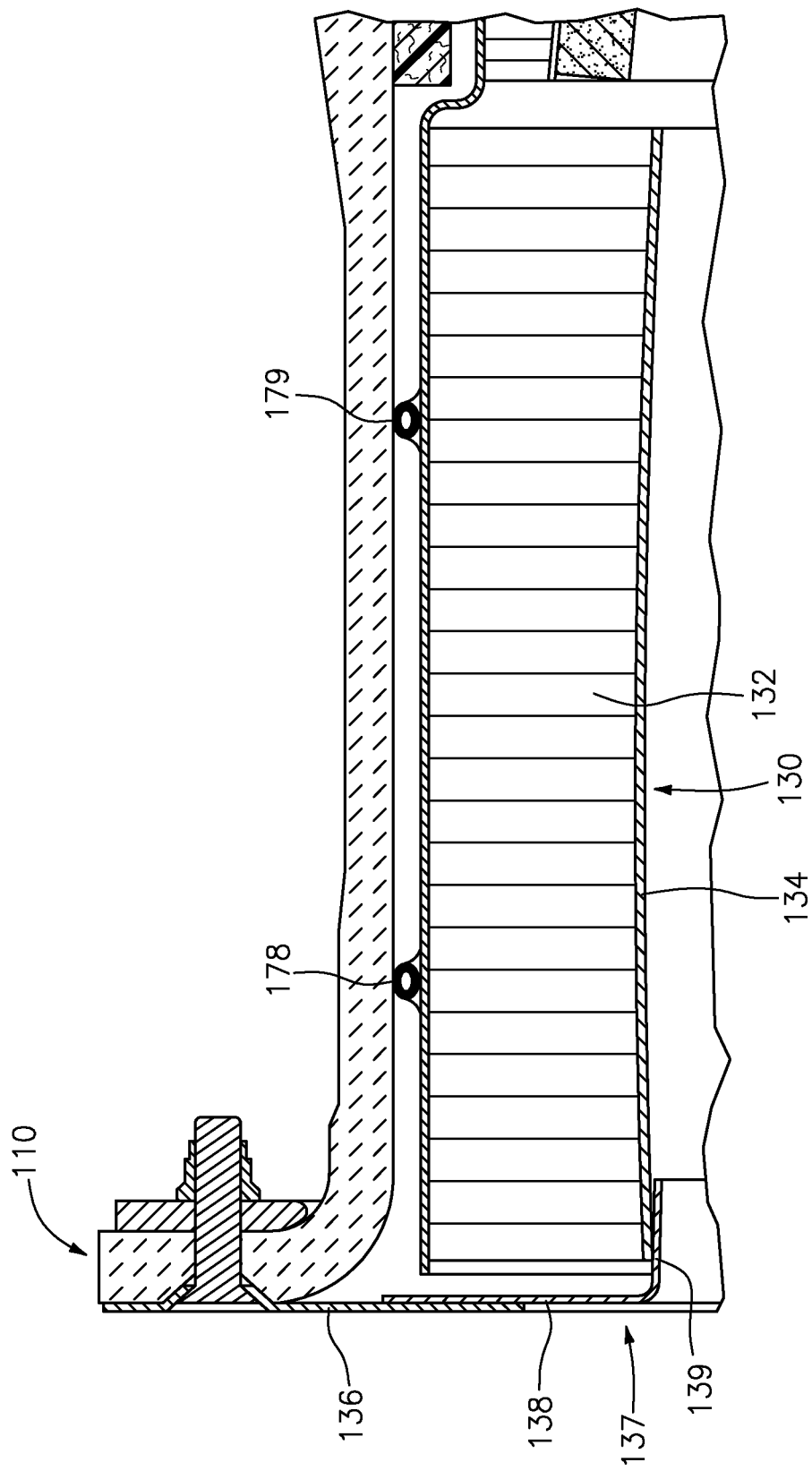
FIG. 4C is an enlarged view of a forward portion of the forward liner cartridge region of the assembly of FIG. 4.

The upstream section 173 is along the outer (radially outboard) surface of the honeycomb 132, with the upstream end/rim 171 axially aligned with the upstream end/rim of the honeycomb 132. This upstream section 133 is positioned relative to the inboard surface 106 of the containment case via radial dampers 178 and 179 (FIG. 4C). Exemplary radial dampers are constructed from silicone rubber or other suitable damping material. They may be adhesively bonded to the outboard surface of the liner 170 (e.g., prior to installation of the cartridge). Exemplary dampers may be full annulus or segmented in their axial positioning and circumferential extent may be tailored to break-up the natural frequency modes that may be found in the cartridge based on the frequency response requirements. If the cartridge has sufficient stiffness, such dampers may not be required.

To longitudinally and radially retain the forward portion of the cartridge (e.g., the forward portion of the forward acoustic liner 130) a flange structure may be provided (e.g., via the combination of the circumferentially segmented capture plate 136) having an outboard portion with the aft face secured against a forward face of the flange 110 (e.g., via fasteners such as bolts). The exemplary capture plate extends from an outboard (outer diameter or OD) periphery to an inboard (inner diameter or ID) periphery. The flange further includes a close out plate 137 having, in axial section, a generally L-shape/section with a radially outwardly-extending leg 138 and an aftward/downstream extending foot 139 (forming a sleeve structure). The close out plate may similarly be circumferentially segmented and an outboard portion of the leg 138 may be secured to an inboard portion of the capture plate (e.g., via bonding and riveting). An outboard face of the foot captures a forward portion of an inboard surface of the forward liner (e.g., of the liner 134).

Essentially longitudinally coextensive with the wedge honeycomb 160 and abradable rub material 150, a ballistic liner 180 (e.g., aramid fiber) may also be provided and secured with its outboard surface along the inboard surface 106 of the containment case. The exemplary ballistic liner comprises a plurality of aramid plies and epoxy resin. It may be pre-cured and secondarily bonded or co-cured with the composite containment case. Anti-rotation features (discussed below) may be bonded to the inner surface of this liner or forward or aft directly to the fan case. Downstream/aft of the honeycomb wedge 160, abradable rub material 150 and ballistic liner 180 is an ice impact liner 182 (e.g., formed of an aluminum honeycomb with impact resistant flowpath liner (e.g., aramid fiber). Downstream of the ice impact liner 182 is an acoustic liner (assembly) 186 which may include an aluminum honeycomb and an inboard/ID liner (e.g., of aluminum or aramid fiber). Downstream of the acoustic liner assembly 186 the guide vane (i.e., 84) ring may be mounted to the downstream portion of the containment case and the mounting ring 120. A recirculation seal/damper 187 may be positioned axially between the ice impact liner 182 and the wedge honeycomb (e.g., to help maintain aero-smoothness and damp movement of the cartridge in the axial direction (and optionally in the radial direction)).

Figure 6:
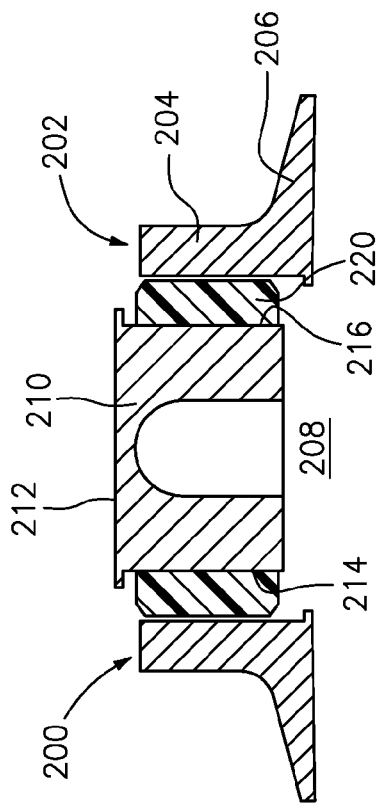
FIG. 6 is a second transverse sectional view of the first mounting subassembly, taken along line 6-6 of FIG. 4B.

A radially compliant/accommodating attachment system comprises a circumferential array of sets 190 (FIG. 5) of wear assemblies 192 and receiving members 194. Each wear assembly is accommodated in an associated said receiving member. The exemplary wear assemblies are mounted to the inboard/ID surface of the ballistic liner. The exemplary receiving members are mounted to the outboard/OD surface of the ring 170. In the exemplary implementation, this is along the downstream section 175. Each receiving member forms a compartment receiving the associated wear assembly. The exemplary receiving members are formed by a pair of longitudinally-extending L-sectioned brackets 200, 202 (FIG. 6). Each bracket has (when viewed in section) a leg 204 and a foot 206. The exemplary feet 206 point circumferentially oppositely outward from a channel 208 formed between the legs. The exemplary undersides of the feet are mounted to the outboard/OD surface of the liner 170 (e.g., via thermoset adhesive (e.g., epoxy) and/or mechanical fasteners (e.g., rivets)).

Figure 7:
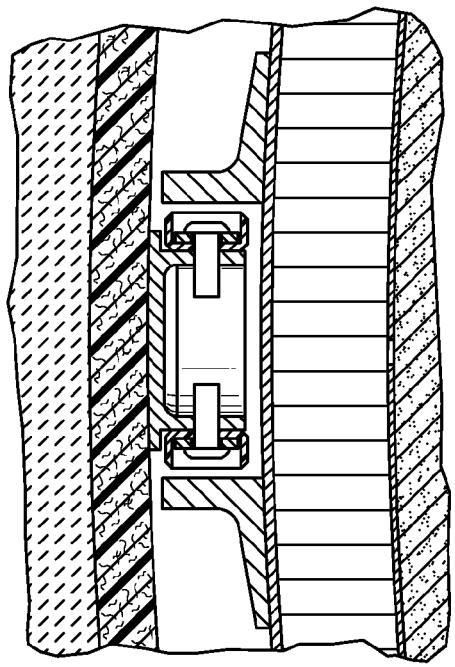
FIG. 7 is a transverse sectional view of a second/alternate mounting subassembly.
Figure 5:
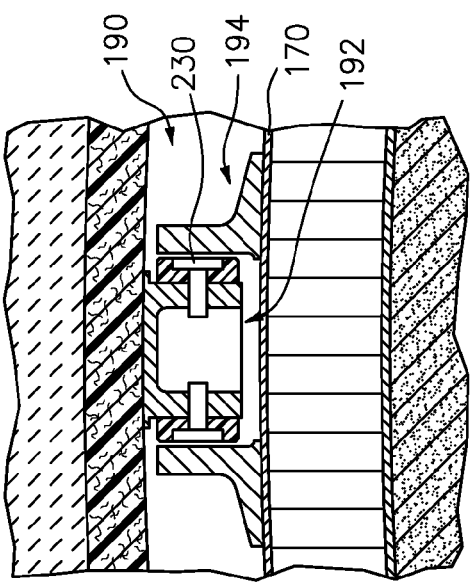
FIG. 5 is a first transverse sectional view of a first mounting subassembly of the assembly of FIG. 4, taken along line 5-5 of FIG. 4B.
Figure 16:
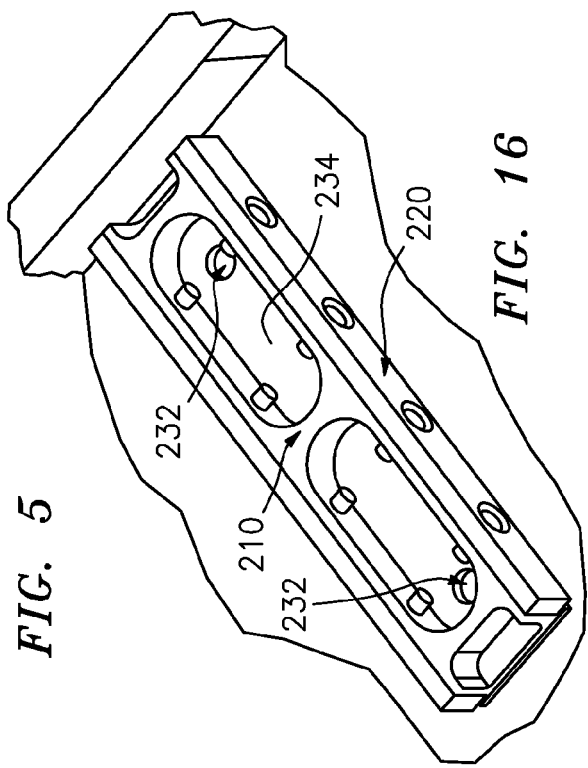
FIG. 16 is a view of the wear block assembly of the mounting assembly of FIG. 7.

The exemplary wear assemblies (of which a first embodiment is seen in FIGS. 5 and 6 and a second embodiment is seen in FIGS. 7 and 16) comprise a structural core (block) 210 (e.g., machined aluminum (alloy) or other metal) to which wear pads are mounted. Each exemplary block has an exemplary four wear pads in two pair. The exemplary block comprises an outboard surface 212 mounted to the inboard surface of the ballistic liner 180 (e.g., via thermoset adhesive (e.g., epoxy)). Along each of its circumferential sides 214, 216 the exemplary block includes a forward wear pad and an aft wear pad. Each exemplary wear pad 220 is longitudinally elongate (e.g., of rounded rectangular planform) and comprises a body of a wearable low friction material (e.g., a non-metallic material such as PTFE). The exemplary wear pads are secured to the block via adhesive or mechanical fasteners. Exemplary fasteners comprise a pair of rivets 230 with heads in corresponding compartments extending from the circumferentially outboard face of the wear pad and legs shaft/shafts extending circumferentially inward through walls of the block 210. FIG. 16 further shows alignment holes 232 in a circumferential outer diameter (OD) web 234 of the block 210 for locating the block circumferentially and axially relative to the fan case (e.g., during assembly/bonding via tooling (not shown) using fan case assembly datums). FIG. 16 shows the respective wear pads as essentially full length along the block. Alternative embodiments may involve shorter wear pad segments (e.g., two or three segments or separate wear pads per side).

An exemplary number of sets 190 is 4-10, more narrowly, 5-8, with an exemplary seven shown. Each block 210 has an inboard extremity 240 which, in a neutral condition, may be radially spaced apart from the adjacent outboard/OD surface of the liner 170 (or other component forming the channel base). The exemplary pairs of wear pads have their circumferentially outboard surfaces generally flat and parallel and in closely facing or sliding engagement with the adjacent circumferentially inboard faces of the legs 204 of respective brackets 200 and 202 (the walls of the channel). This close accommodation maintains concentricity of the liner and containment case while allowing for differential thermal expansion. In this example, thermal expansion properties of the containment case are dictated by the coefficient of thermal expansion of its ceramic material; whereas thermal expansion properties of the liner assembly are dictated by the coefficient of thermal expansion (CTE) of its metallic material (i.e. the CTE of the ring 170).

In an exemplary implementation, the fan blades and its hub (collectively fan) are made of metal (e.g., an aluminum alloy or a titanium alloy). The fan containment case is formed of a much lower CTE material. The cartridge structural material (forming the driver of its thermal expansion/contraction) may have a CTE closer to that of the fan blades (e.g., within 5% of the CTE of the fan blades, more broadly, within 7%). In the exemplary embodiment, the fan blades are made from aluminum and the structural components of the cartridge are made from aluminum. Take-off conditions may result in hot temperatures (e.g., ~120 F (~-50 C)). The cartridge will expand circumferentially. Because of the anti-rotation features, the cartridge is forced to expand radially outward. The fan blades will also grow radially by a similar amount because of the similar materials. At cruise conditions, fan temperatures are very low (e.g., −65 F (~-50 C) or so). The cartridge will tend to shrink because of the cold temperatures. The anti-rotation features force the cartridge to move inward radially as the hoop contracts. The fan blades will also shrink because of the cold temperatures by a similar amount. In this way, a passive clearance system can be created which essentially eliminates any negative thermal effects on clearance.

Figure 8:
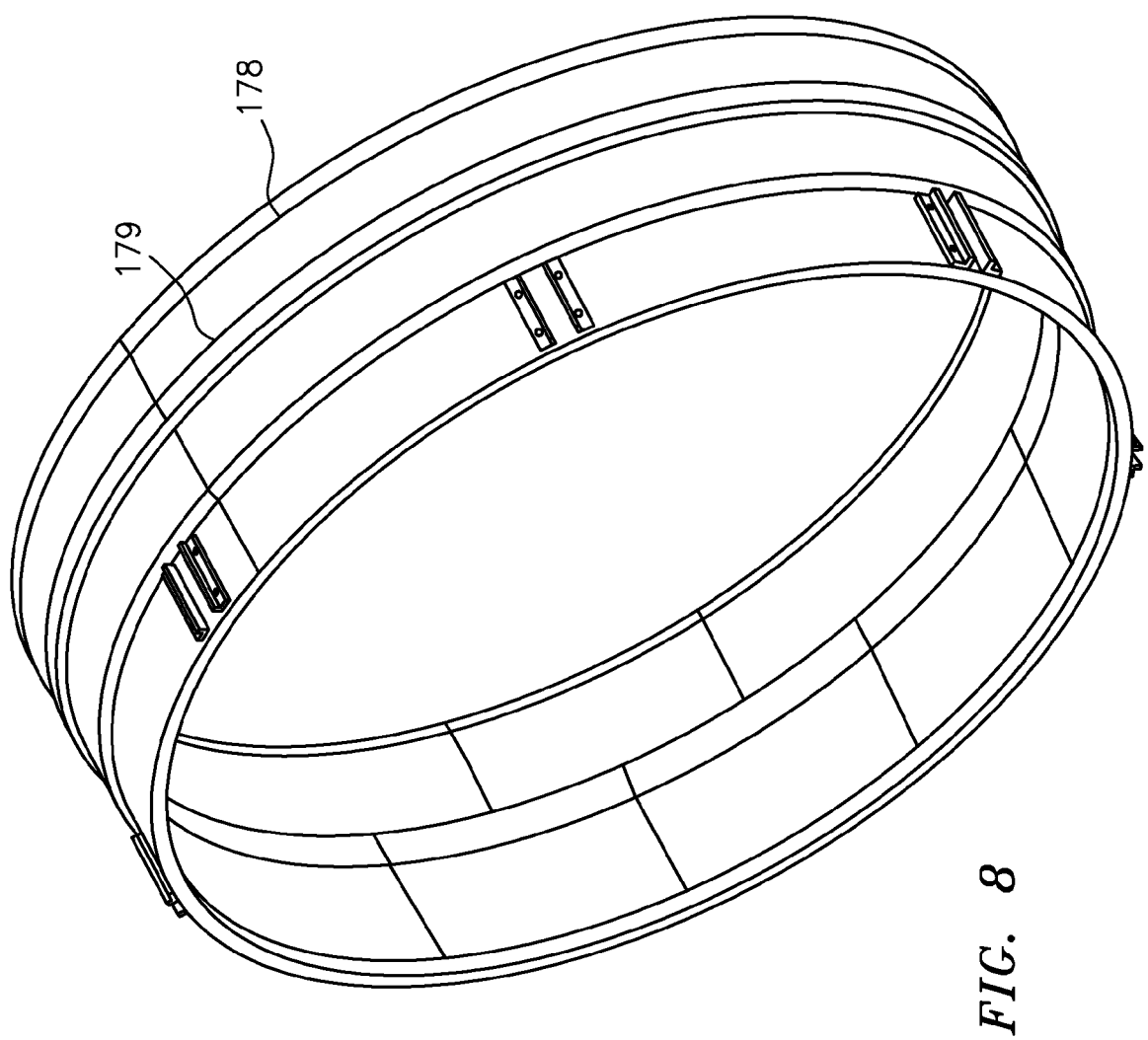
FIG. 8 is a view of a forward cartridge liner subassembly of the assembly of FIG. 4.

FIG. 8 shows a liner cartridge comprising the liner 170, the brackets 200 and 202, the abradable liner assembly 140, wedge honeycomb 160, and lesser components.

Figure 9:
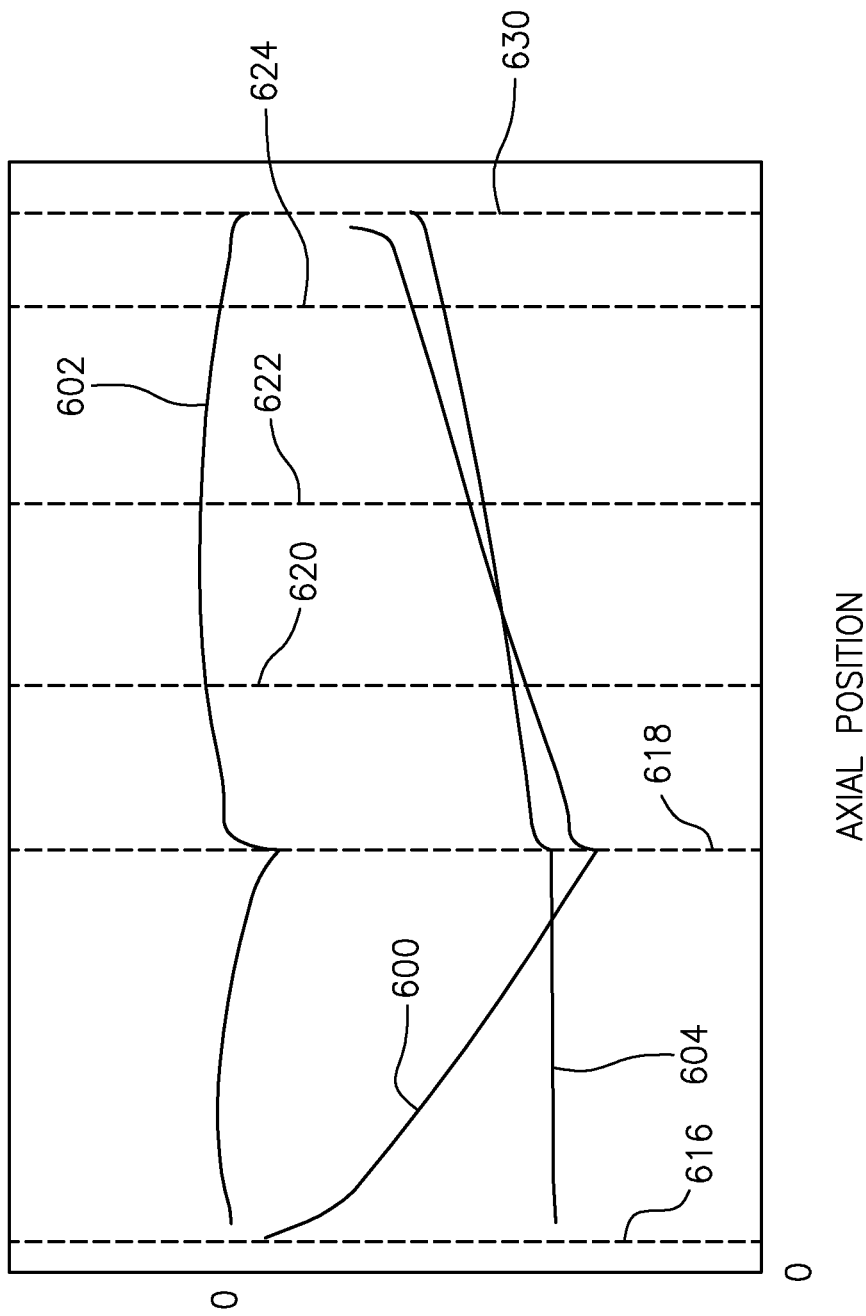
FIG. 9 is a plot of radial closure versus axial position along the cartridge subassembly.

FIG. 9 shows plots of radial displacement (Y axis) versus axial position (X axis in engine coordinates) at aero design point (ADP) which, in this case, is a cruise condition. Ambient temperature is approximately −65 F (~-50 C), although the temperature in the fan will be slightly warmer because of the work being performed by the fan on the air. A zero value of axial position is at the flange 110. Near this location 616, the close out plate leg/sleeve 139 holds the ID surface of the liner assembly essentially radially fixed relative to the fan containment case. Trace/plot 600 shows the displacement of the exemplary cartridge. Trace/plot 602 shows an alternative organic matrix composite (OMC). Trace/plot 604 shows an alternative aluminum system. X location 618 represents a boundary location region between the forward acoustic liner 130 and the abradable liner assembly 140 (e.g., at the shoulder 176); location 620 represents the leading edge of the fan blade at the tip; location 622 represents the stacking line at the tip; and location 624 represents the trailing edge at the tip. An approximate region between location 620 and 624 thus represents the region most relevant to clearance control and which, most desirably, provides a close match of the thermal expansion performance of the case to the blades. Location 630 represents the trailing edge/end of the rub strip. The exemplary trace/plot 600 shows that, adjacent the fan blades, displacement is close to that of the aluminum alternative wherein better accommodation of the fan blades is achieved; whereas, at the upstream end there is little displacement. The radial movement at the upstream end of the cartridge is restricted by the closeout plate 138/139 which is bolted to the A-flange 110. There is still hoop contraction force at cold temperatures but the closeout plate resists local inward radial displacement/contraction of the cartridge and provides a smooth transition from the nacelle liner surface ahead of the cartridge (as in the non-metallic alternative). The alternative hypothetical non-metallic system in plot 602 suffers from excessive clearance. The alternative metallic system of plot 604 suffers from a non-smooth inlet interface causing a dam in the flowpath.

Exemplary fan tip radii are in excess of thirty inches (0.76 m) from the engine centerline. In the exemplary implementation, a maximum net displacement occurs at or near the location 618. An exemplary amount of this maximum displacement is a relative radial contraction of at least 0.05% of the initial fan tip radius (either locally or the maximum fan tip radius). More narrowly, the exemplary contraction is at least 0.10%. In absolute terms with the exemplary thirty-inch radius fan being near the small end of likely fan sizes, exemplary relative contraction is at least 0.3 mm, more narrowly, at least 0.4 mm or 0.8 mm, with likely values increasing with fan size. Exemplary radial contraction at the location 616 is less than 50% of the maximum relative radial displacement, more narrowly, less than 25% or less than 10%. Thus, in the region between 616 and 618, radial contraction progressively will increase.

At the locations 620, 622, and 624, exemplary displacement is progressively less than at 618 but still more than at 616. At these locations, relative radial displacement will likely be at least 40% of the maximum radial displacement, more narrowly, at least 50% and will still likely be in excess of the relative and absolute values noted above for the location 618 (with the actual values at the location 618 then likely being slightly larger than those minimum values). In a band between 618 and 624, more narrowly, between 620 and 624, there is a progressive decrease in the contraction magnitude. In the exemplary embodiment, this decrease has a plotted slope of smaller magnitude than the contraction increase between 616 and 618.

FIG. 10 shows a fixture 400 for assembly of the cartridge. FIG. 11 shows the fixture with cartridge in place. The fixture comprises a base 402. The exemplary base is formed as a metallic annular plate having an upper surface/face 404. The fixture further comprises a mold tool 406 (e.g., formed of al). The mold tool 406 comprises an annular wall having an installed condition mounted to the upper surface/face 404. The mold tool extends from a lower end/rim 408 to an upper end/rim 410 and has an inboard face 412 and an outboard face 414. The exemplary mold tool and fixture define, in the installed condition, a central longitudinal axis 520 which is coincident with the central longitudinal axes of the cartridge and its components (which in turn become coincident with the engine centerline 500 when installed). The exemplary inboard face or surface 412 is radially stepped in complementary fashion to the liner 170 to define upper, intermediate, and lower portions to respectively receive and contract the sections 173, 174, and 175 of the liner 170.

The exemplary mold tool has an axial split 416 (FIG. 10). In the exemplary tool, this is a single axial split. In the installed condition, the split is closed. The mold tool may be secured in the installed position via fasteners 420 (e.g., in pockets in the outboard face and extending into (e.g., threaded into the base)). As is discussed further, the axial split facilitates cartridge removal after the cartridge is assembled.

The fixture 400 further includes an upper capture plate 430 (e.g., aluminum or steel) which has an installed condition mounted at the upper end of the mold tool (e.g., by means of alignment bolts (not shown). The exemplary capture plate 430 is generally annular and protrudes radially inward/inboard so that its underside 434 may face/abut an adjacent end of the cartridge with a corresponding portion 436 of the surface 404 facing/abutting the opposite end of the cartridge.

FIG. 12 shows the mold tool as having openings/windows 440 corresponding to the pairs of L-brackets. For each of these openings, there is a dividing fixture 450. The exemplary dividing fixture (block) 450 comprises a foot or base 452 having an assembled condition mounted to the upper surface of the base 402. A leg 454 of the fixture 450 extends upward and has a lower portion 454 along the window and protruding radially into the window (e.g., and secured such as via screws, bolts, pins, or other fasteners). An upper portion 456 is received in a rebate along the outer/outboard face 414 of the mold tool and may be secured thereto such as via tight tolerance bolts or tooling pins (not shown, e.g., through holes 457 in the upper portion 456 and mold tool). Opposite circumferential sides of the portion 454 form surfaces to register the inboard surfaces of the legs of the L-brackets during manufacture.

In an exemplary sequence of operation, the liner 170 is pre-formed by welding and spinning aluminum sheetmetal.

The fixture may initially be positioned with the mold 406 tool mounted to the base plate 402 and the capture plate 430 removed. The liner 170 may then be inserted. Scrim supported or reticulated adhesive may then be used to bond the forward acoustic liner 130, honeycomb 132, and the honeycomb wedge 160 to the liner 170. These and other honeycomb and liners (e.g. 132/134) may be bonded in the same cure cycle. Similarly, septum 136, wedge 160, the abradable rub material 150 may be bonded at that time. The adhesive is tacky during the installation (as discussed below, the assembly is autoclaved to cure it all at once). The various brackets 200 and 202 may be bonded and/or riveted through the windows in the fixture. This may be performed simultaneously to or before or after bonding of the various components to the interior of the liner 170. For efficiency, a single autoclave bonding may cure all at once.

When the interior components and brackets are positioned and at least provisionally secured, the capture plate may be put in place and, optionally, secured (e.g., via fasteners not shown). The fixture and cartridge may then be vacuum bagged (not shown) and then cured (e.g., in an autoclave at an exemplary temperature of 250 F (~120 C)). After the cure and any optional cooldown, the bag may be removed. The capture plate and dividing fixtures 450 may be removed. For example, the capture plate may be unfastened (screwed or bolted) from the mold tool upper end and the fixtures may be removed via unfastening their respective feet and upper portions and sliding radially outward and then vertically extracting. To facilitate this sliding, the feet 452 may be in recesses in the base having sufficient radial clearance. The radial sliding allows removal from the tightly toleranced L-brackets. The mold fixture may then be unsecured from the base and separated along its split to allow removal of the basic cartridge. Removal of the dividing fixture (fixture block) allows the associated brackets to pass vertically upward (no longer being blocked by the relatively wide upper portions 456). The windows 440 may extend not merely along the lowest/smallest of the three steps of the ID surface of the mold tool but also through the intermediate step and optionally partially onto the upper step. This allows the brackets to pass vertically without being locally blocked by the intermediate portion of the mold tool. The cartridge may be completed via positioning and bonding any axial and radial dampers. In alternative variations, the dampers may be mounted in the fixture and bonded as part of the bagging/curing process.

In an initial installation or a replacement, the completed cartridge may be installed through the front of the fan case. The closeout panels (capture plate 136 and close out plate 137) may be attached using bolts through the flange and adhesive bonding to the front face of the cartridge. This creates a local axial and radial constraint at the flange and provides a structural link to the fan case body. Thus, in this exemplary implementation, there is only a rear/aft axial seal/damper.

In a cartridge replacement situation, the closeout panels are unbolted. To the extent that the closeout panels are still adhered to the cartridge, the cartridge may be pulled out through the front opening of the fan case via the closeout panels or may otherwise be extracted. A new cartridge or remanufactured cartridge may be installed into the fan case shell. If not already applied during cartridge manufacture, new seals are applied/attached prior to cartridge insertion. New closeouts may be installed by bonding to the cartridge and bolting to the A-flange. In alternative implementations, the closeouts may be removed from the cartridge and cleaned for reuse. In such a replacement situation, after extraction of an old cartridge, the wear pads may be removed and replaced (e.g., via cutting rivet shanks or drilling to remove and re-riveting new pads).

In various implementations, the liner 170 may be refurbished and/or reused. Various techniques used to repair materials/components such as are carried by the liner may be used to restore such materials/components on the liner. The remanufactured cartridge formed by the liner and any additional replaced or restored components may be installed in the same fan case or a similar fan case.

One or more embodiments have been described. Nevertheless, it will be understood that various modifications may be made. For example, when implemented in the redesign/re-engineering of a baseline engine configuration or remanufacturing of such an engine, details of the baseline will influence details of any particular implementation. Accordingly, other embodiments are within the scope of the following claims.

What is claimed is:

1. A turbofan engine comprising:
   a fan having a circumferential array of fan blades;
   a fan case surrounding the fan;
   at least one compressor section;
   a combustor; and
   at least one turbine section,
   wherein the fan case comprises:
   a composite structural member;
   a metallic member encircled by the composite structural member and mounted to the composite structural member to permit differential thermal expansion proximate the blades;
   a plurality of radially outwardly open channels on the metallic member; and
   a plurality of inwardly radially projecting members received by the channels.

2. The engine of claim 1 wherein:
   the composite structural member comprises an organic matrix composite.

3. The engine of claim 1 further comprising:
   an abradable liner carried by the metallic member.

4. The engine of claim 3 wherein:
   the abradable liner is non-metallic; and
   a metallic honeycomb is radially between the abradable liner and the metallic layer.

5. The engine of claim 1 wherein at least one of:
   each of the radially outwardly open channels is formed by a pair of L-sectioned metallic brackets with feet oppositely circumferentially outwardly projecting and legs radially outwardly projecting;
   each of the inwardly radially projecting members comprises a radially-inwardly projecting portion and at least one pair of wear pads mounted circumferentially opposite each other to the radially-inwardly projecting portion and in contacting or facing relation to respective sides of the associated channel;
   there are 4-10 said channels;
   a portion of the composite structural member aft of the metallic member is secured to a mounting ring; and
   a portion of the composite structural member aft of the metallic member encircles and is mounted to a guide vane ring.

6. A method for operating the turbofan engine, the turbofan engine of claim 1, the method comprising:
   accelerating the engine from an initial condition of zero speed, a fan case initial temperature, and an initial altitude; and
   flying the engine to a cruise condition of a non-zero cruise speed, a fan case cruise temperature less than the fan case initial temperature, and a cruise altitude greater than the initial altitude,
   wherein:
   as the engine goes from the initial condition to the cruise condition, the differential thermal expansion radially contracts the metallic member relative to the composite structural member; and
   the relative radial contraction is one or both of at least 0.3 mm or at least 0.05% of a fan tip radius at the initial condition.

7. The method of claim 6 wherein:
   the relative radial contraction is greater proximate a trailing extreme of the metallic member than a relative radial contraction, if any, proximate a leading extreme of the metallic member.

8. The method of claim 6 wherein:
   the relative radial contraction is mechanically resisted proximate a leading extreme of the metallic member.

9. A turbofan engine comprising:
   a fan having a circumferential array of fan blades;
   a fan case surrounding the fan;
   at least one compressor section;

a combustor; and
at least one turbine section,
wherein:
 the fan case comprises:
  a composite structural member; and
  a metallic member encircled by the composite structural member and mounted to the composite structural member to permit differential thermal expansion proximate the blades; and
 the metallic member is in a cartridge comprising:
  a first honeycomb having an ID liner encircled by a forward portion of the metallic member;
  a second honeycomb encircled by the metallic member aft of the first honeycomb; and
  a rub strip encircled by the second honeycomb.

10. The engine of claim 9 wherein:
the first honeycomb comprises a metallic honeycomb;
the second honeycomb comprises an aluminum alloy honeycomb with ID aluminum alloy septum; and
the rub strip comprises an epoxy-filled aramid fiber honeycomb and has ID and OD surfaces each radial converging aftward.

11. The engine of claim 9 wherein:
differential thermal expansion of the metallic member is constrained at a leading extremity relative to a trailing extremity.

12. A turbofan engine fan case cartridge comprising:
a metallic member;
a first honeycomb having an ID liner and encircled by a forward portion of the metallic member;
a second honeycomb encircled by the metallic member aft of the first honeycomb; and
a rub strip encircled by the second honeycomb,
wherein:
 the metallic member bears, along an OD surface, mounting means for engaging a fan containment case.

13. The cartridge of claim 12 wherein:
the metallic member is radially stepped.

14. The cartridge of claim 13 wherein:
an outboard surface of the second honeycomb is radially stepped corresponding to the radial stepping of the metallic member.

15. The cartridge of claim 12 wherein:
the mounting means form channels.

16. The cartridge of claim 15 wherein:
the mounting means comprise pairs of L-sectioned brackets defining said channels between legs of the brackets.

17. A method for manufacturing a turbofan engine fan case cartridge, the method comprising:
assembling to a fixture, the combination of:
 a metallic outer member; and
 a liner;
inserting a plurality of brackets through apertures in a sidewall of the fixture; and
securing the brackets to the metallic outer member.

18. The method of claim 17 being a remanufacturing method re-using the metallic outer member from which a used liner has been removed.

19. The method of claim 17 further comprising:
bonding the liner to the outer member.

20. The method of claim 19 wherein:
the bonding comprises a vacuum bag autoclave bonding.

21. The method of claim 17 wherein:
the fixture comprises a mold tool having a single axial split;
the mold tool is removed from a base after the securing;
the split is opened to allow removal of the assembled cartridge; and
the assembled cartridge is thereafter removed.

22. The method of claim 21 wherein:
the assembling is in situ in the mold tool.

23. A fixture for manufacturing a turbofan engine fan case cartridge, the fixture comprising:
a base;
a mold tool having a mounted condition extending upward from the base and defining a central longitudinal axis, the mold tool comprising a sidewall with a plurality of openings; and
a capture plate extending radially inward at an upper portion of the mold tool so as to define an annular axial compartment for holding the cartridge between the base and the capture plate.

24. The fixture of claim 23 wherein:
the mold tool has a single split.

25. The fixture of claim 23 wherein:
a plurality of members divide each of the openings into first and second circumferential portions.

26. The fixture of claim 23 wherein:
an inboard surface of the mold tool is stepped.

27. The fixture of claim 23 wherein:
the base is annular.

\* \* \* \* \*